United States Patent Office 3,619,834
Patented Nov. 16, 1971

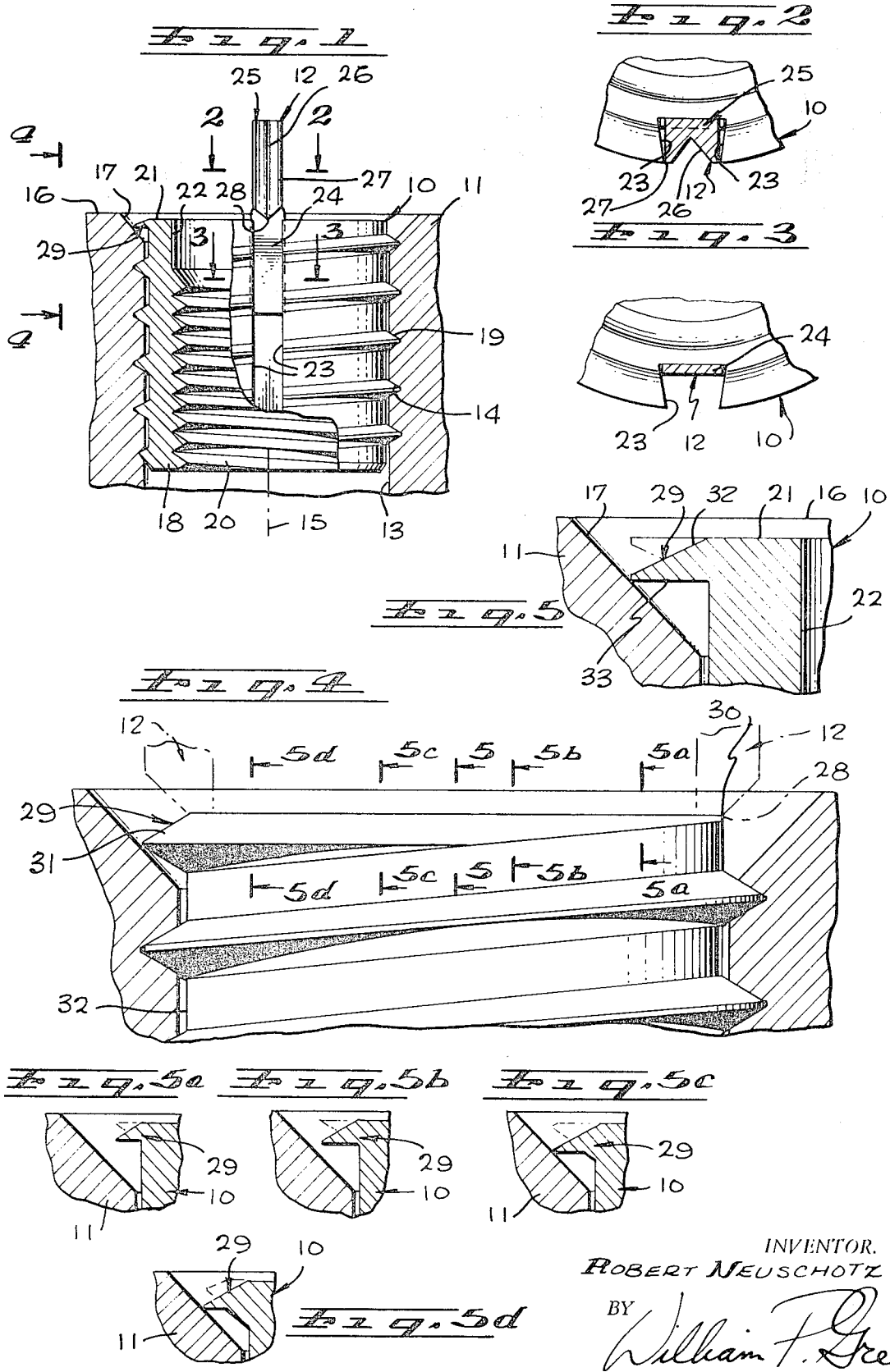

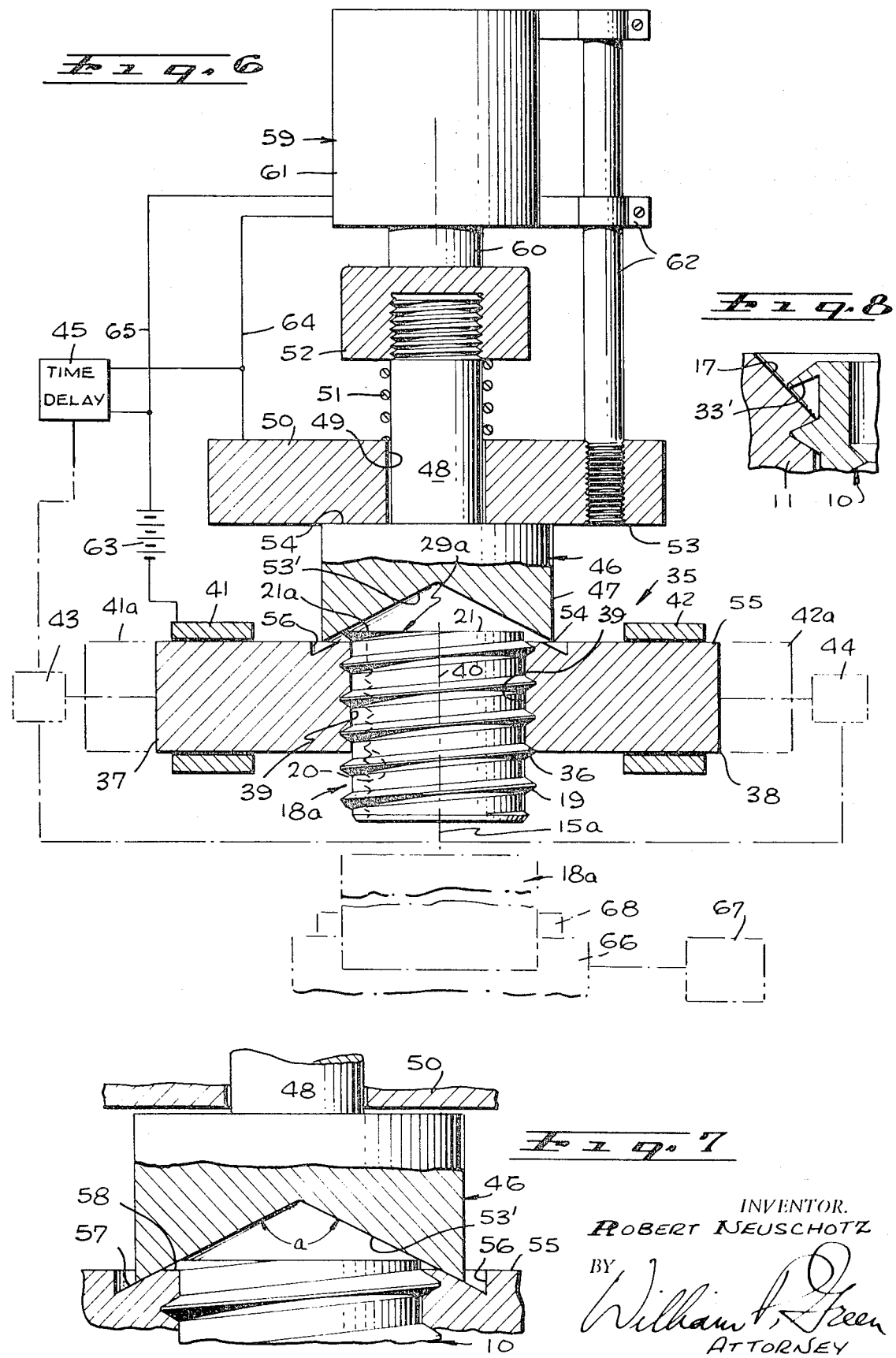

3,619,834
MANUFACTURE OF FASTENER UTILIZING DEFORMED THREAD AS STOP SHOULDER
Robert Neuschotz, 1162 Angelo Drive,
Beverly Hills, Calif. 90210
Filed Dec. 23, 1968, Ser. No. 786,075
Int. Cl. B21d 53/24; B23g 9/00
U.S. Cl. 10—2        18 Claims

ABSTRACT OF THE DISCLOSURE

Methods and apparatus for manufacturing a fastener having an external thread with an axially outer end turn deformed to a condition in which the deformed thread portion will serve as a stop shoulder for limiting the extent to which the fastener can be screwed into a carrier part, and with the end turn being contacted directly at its axially inner side during deformation by a shaping surface, which controls precisely the position and configuration of the axially inner side of that end turn after deformation, so that the effective stopping surface of the deformed thread will accurately locate the fastener in a predetermined flush or slightly underflush position relative to the carrier part.

CROSS REFERENCE TO RELATED APPLICATION

The fasteners with which the present invention is concerned are similar to those shown in my prior application Ser. No. 688,563, filed Dec. 6, 1967, now U.S. Pat. 3,435,870.

BACKGROUND OF THE INVENTION

This invention relates generally to the manufacture of fasteners of a type having an external thread adapted to be screwed into a carrier part, and having a second series of threads to which a coacting element is connectible, to secure that element to the carrier part through the medium of the fastener. It will be apparent from the description of the preferred embodiment that the invention can be applied to either insert type fasteners in which the second set of threads are internal for receiving a bolt or the like, or stud type fasetners in which the second set of threads are on an axially outwardly projecting shank and are external. However, the invention will be described primarily as applied to the first of these types of fasteners, in which the second threads are internal.

In my above mentioned prior application, I have disclosed a fastener having an external thread with an axially outer end turn deformed in a manner enabling at least a portion of that end turn to function as a stop shoulder, for limiting the extent to which the fastener is screwed into a passage in a carrier part. The deformed thread is so located as to halt advancement of the fastener at a position in which an outwardly facing surface formed on the fastener at the outer end of the external thread is flush or slightly underflush with respect to the carrier part. This enables a coacting member to be tightened downwardly against the outer surface of the carrier part without contacting the mentioned surface on the fastener, to thus optimize the connection formed between the various parts.

SUMMARY OF THE INVENTION

The methods and apparatus of the present invention incorporate improvements in the manufacture of a deformed thread fastener of the above discussed general type, and are adapted to attain a greatly improved precision in the exact position at which the deformed thread will halt installing advancement of the fastener thread into a carrier part. In many installations, very little tolerance can be left in the ultimate setting of the fastener, and it is required for effective functioning of the fastener in the final overall structure that the mentioned axially outwardly facing surface at the outer end of the external thread be located at a very accurately predetermined and controlled flush or slightly underflush position with respect to the outer surface of the carrier part, which position cannot vary under any circumstances more than a few thousandths of an inch.

Upon installation within a carrier part of a fastener made in accordance with the present invention, the advancement of the fastener into the carrier part is limited by engagement of an axially inner side of the deformed thread portion with a countersink surface or other axially outwardly facing surface on the carrier part. In manufacturing a fastener by the present methods and apparatus, the desired increased accuracy of positioning the fastener is attained by controlling precisely the configuration and location of the surface at the axially inner side of the deformed turn which engages the carrier part in stopping relation. For this purpose, I directly contact the axially inner side of the end turn of the thread with a shaping surface of precise position during the deforming operation, so that the stop surface formed at that side of the thread will correspond exactly to the shaping surface. Preferably, the thread is deformed axially inwardly against the shaping surface, as a backing structure, with a force sufficient to deform the thread portion into a configuration determined by and corresponding to the shaping surface. During the deforming operation, the fastener may be retained in a holder, which may have an internal thread into which the fastener is screwed to a proper position for deformation. The deforming structure may take the form of a ram which is desirably automatically responsive to movement of the fastener into engagement with the ram to move axially and press the end turn of the thread against the shaping or backing surface. The holder may be formed of two separable sections which move apart to release the fastener after the deforming operation.

BRIEF DESCRIPTION OF THE DRAWING

The above and other features and objects of the invention will be better understood from the following detailed description of the typical embodiment illustrated in the accompanying drawings in which:

FIG. 1 is a partly elevational and partly axial sectional view of an insert formed by the methods and apparatus of the present invention, with the insert shown positioned within a carrier part;

FIGS. 2 and 3 are enlarged fragmentary transverse sections taken on lines 2—2 and 3—3 respectively of FIG. 1;

FIG. 4 is an enlarged fragmentary view taken on line 4—4 of FIG. 1;

FIGS. 5, 5a, 5b, 5c and 5d are fragmentary sections taken on lines 5—5, 5a—5a, 5b—5b, 5c and 5c and 5d—5d respectively of FIG. 4;

FIG. 6 is a somewhat diagrammatic representation of apparatus constructed in accordance with the invention and designed for deforming a portion of an axially outer end turn of the FIG. 1 insert;

FIG. 7 is an enlarged fragmentary representation of a portion of the FIG. 6 apparatus, shown after deformation of the thread; and FIG. 8 is a view similar to FIG. 5 but showing a variational type of deformed thread.

DESCRIPTION OF THE PREFERRED EMBODIMENT

With reference first to FIG. 1, I have shown at 10 a fastener of the insert type which is shown positioned within a carrier part or body of parent material 11. The fastener is similar to the fasteners disclosed in my above mentioned prior application Ser. No. 688,863, and is generally of the type shown in my U.S. Pat. No. 2,855,970, issued Oct. 14, 1958, having axially driveable keys 12 for locking the fastener in the carrier part. The carrier part contains a passage 13 having an internal thread 14 centered about an axis 15, and having an outer typically planar surface 16 disposed transversely of axis 15. An annular frustoconically tapering countersink surface 17, centered about axis 15, is provided at the radially outer end of thread 14.

The fastener 10 has a generally tubular rigid desirably metal body 18, having external threads 19 corresponding to threads 13 of the carrier part, and adapted to be screwed into those threads 13. Fastener body 18 also has internal threads 20, which are concentric with threads 13 and 19, and centered about axis 15 in the FIG. 1 installed position of the fastener. At the axially outer end of external thread 19, the fastener body 18 has an annular outer end surface 21, which preferably is disposed directly transversely of and is centered about axis 15, and which in the FIG. 1 installed position of the fastener is received substantially flush with, or preferably slightly under a flush position with respect to, outer surface 16 of the carrier part, so that a screw connected into internal threads 20 can tighten a plate or other element downwardly against carrier part surface 16, without interference by the fastener, and desirably without contacting surface 21 of the fastener. A short cylindrical counterbore 22 may be provided internally within the fastener body at the axially outer end of threads 20.

The device may include one or more of the locking keys 12, desirably two such keys at diametrically opposite locations. These keys are initially held frictionally within two diametrically opposite grooves 23 formed in the outer surface of body 18, and with the keys projecting upwardly as illustrated in FIGS. 1 and 4. Each groove 23 extends axially through and interrupts external thread 19 of body 18, and is desirably of the dovetail or undercut cross-section illustrated in FIGS. 2 and 3, so that an axially inner radially thin mounting portion 24 of the key can be effectively located and confined within the deepest or radially innermost portion of the dovetail groove, to effect the desired frictional retention of the key in its FIG. 1 position. The axially outer portion 25 of each key is radially thicker than portion 24 (see FIG. 2), and projects radially outwardly far enough to cut through the internal threads 14 of the carrier part when the key is driven axially inwardly from the FIG. 1 position. Locking portion 25 of the key may have a central longitudinal groove 26 extending therealong, to divide portion 25 into two parallel cutting ribs 27, which are shaped at their lower or axially inner ends to provide a tapered leading edge or point 28 for cutting into the material of the carrier part.

In accordance with the present invention, when fastener body 18 is screwed downwardly into passage 13 of the carrier part, the advancement of the fastener body into the carrier part is limited precisely at the FIG. 1 position by engagement with countersink surface 17 of a deformed portion 29 of the axially outermost (upper) end turn of external thread 19 on body 18. The configuration of this deformed portion 29 of the external thread will be best understood by reference to FIGS. 4, 5, 5a, 5b, 5c, and 5d. In FIG. 4, the deformed portion 29 is illustrated as extending from the axially outermost extremity 30 of thread 19 to essentially the location 31, and should desirably not extend through more than a single turn of the thread. For best results, deformed portion 29 has a circular extent between about one-fourth and three-fourths (optimally about one-half) of a turn of the external thread, commencing at its extremity 30. Beyond the location 31, thread 19 is of conventional helical configuration, and may be of standard axial section except for the desired provision of modified minor diameter cylindrical surfaces 32 between successive turns of the thread. Portion 29 is deformed axially inwardly (downwardly in FIGS. 1 and 4), so that as it advances circularly it extends more directly transversely of axis 15 than does the helical remainder of the thread. In the preferred arrangement, portion 29 of the thread has surfaces at both its upper and lower sides which do not advance axially at all as they advance circularly, or stated differently they may be considered as having a substantially zero pitch angle.

FIG. 5 shows in axial section the preferred shape of deformed end portion 29 of the thread as it appears in the plane 5—5 of FIG. 4. As illustrated in FIG. 5, portion 29 may have an upper or axially outer essentially conically flaring surface or face 32, and a lower or axially inner face 33 which is disposed more directly transversely of axis 15 than is surface 32 (desirably exactly transversely), and whose radially outer edge engages countersink surface 17 of the carrier part to halt downward advancement of body 18. In advancing to the left of line 5—5 in FIG. 4, lower transverse surface 33 progressively decreases in radial extent, as seen in FIGS. 5c and 5d, until the full standard thread profile is reached at point 31 in FIG. 4. To the right of line 5—5 in FIG. 4, surface 33 may be discontinued, as indcated in FIGS. 5a and 5b, because of the progressive tapering of the thread to its tip end 30.

FIGS. 6 and 7 represent somewhat diagrammatically a method and apparatus which may be utilized for deforming portion 29 of external thread 19 of the fastener to its FIGS. 4 and 5 condition. In FIG. 6, the fastener body which ultimately becomes body 18 of FIG. 1 is designated 18a, and is shown in a form which it may assume during manufacture of the fastener. More particularly, as shown at 18a, the body has the external thread 19 formed on its outer surface, but the upper or axially outermost portion 29a which is ultimately deformed portion 29 of FIGS. 1 through 5 is illustrated in FIG. 6 in its initial undeformed condition. That is, in FIG. 6, end portion 29a of the thread 19 forms a true helical continuation of the remainder of thread 19, up to the plane of transverse end surface 21. Internal threads 20 in the body may already have been formed in the FIG. 6 condition, and similarly, the transverse outer end surface 21 of the fastener has been machined on the body before performing the operation illustrated in FIGS. 6 and 7. In the initial condition of the body as illustrated at 18a in FIG. 6, surface 21 extends transversely of the axis of the fastener through the entire radial thickness of the side wall of body 18a, from the internal counterbore surface 22 radially outwardly to the major diameter of thread 19, so that thread 19 is not chamfered at its upper end, but rather is defined at its upper side by a continuation of the transverse surface 21, as indicated at 21a in FIG. 6. For best results, the key receiving grooves 23 of FIG. 1 are not formed in the body until after the deforming operation of FIGS. 6 and 7.

For receiving and positioning body 18a of FIG. 6 during a thread deforming operation, I provide a suitable holder 35, containing an internal thread 36 conforming to thread 19 of the fastener body, and into which the body may be screwed along axis 15a of FIG. 6 to the full line position of that figure. To release the fastener body after a thread deforming operation, holder 35 may be formed of two halves or sections 37 and 38, engageable with opposite sides of body 18a, and having complementary internal surfaces 39 each forming one-half of the circular extent of thread 36. As will be apparent, the two halves 37 and 38 of holder 35 meet along an axial plane 40 in the FIG. 6 fastener gripping setting of those holder sections. The two sections 37 and 38 are mounted slidably within appropriate guideway structures 41 and 42 for separating movement away from one another and radially outwardly from axis 15a, in two diametrically opposite directions, as to the broken line positions 41a and 42a of FIG. 6, and far enough to completely release body 18a to fall downwardly out of the holder after a deforming operation. Sections 37 and 38 may be manually actuated between their released and gripping positions, or may be power actuated, as by power driven opening and closing units represented diagrammatically at 43 and 44, desirably energized by a time delay circuit 45, as will be brought out in greater detail at a later point.

Axially opposite the threaded opening 36 in holder 35, there is provided a deforming structure or ram 46, which is concentric about, and moves along, axis 15a. Ram 46 may have an enlarged diameter typically externally cylindrical deforming head 47, and a reduced diameter typically externally cylindrical shank portion 48 extending along and centered about axis 15a. Shank 48 is slidably received and guided within a cylindrical opening or passageway 49 in a rigid stationary guide or frame structure 50 for only axial movement, and may be yieldingly urged to its FIG. 6 position by a coil spring 51 disposed about shank 48 and end against a head or enlargement 52 carried by the shank.

The axially inner surface 53 of the guide or frame structure 50 may be planar, and disposed transversely of axis 15a, to be engageable with an annular transverse surface 54 formed on enlargement 47 of ram 46, to limit the axially outward or upward movement of the ram, under the influence of spring 51, at the FIG. 6 position.

At its axially inner or lower side, head 47 of the ram has a fastener engaging and deforming surface 53', which is annular about axis 15a, and flares downwardly and outwardly, and is for best results shaped as a true cone, preferably flaring at an included angle a of between about 140 and 90 degrees. Surface 53 extends outwardly to a location 54 which is desirably radially outwardly beyond the major diameter of thread 19 of fastener body 18a.

The upper surface 55 of holder sections 37 and 38 may be planar and disposed transversely of axis 15a, except at the location of an annular notch 56 centered about axis 15a and formed to receive the peripheral edge of surface 53' of the deforming ram 46. For this purpose, notch or groove 56 has a conically flaring surface 57 which is parallel to surface 53' of the ram, and may be engageable with that surface 53' to halt axial movement of the ram. Radially inwardly of groove 56, the upper planar surface 55 of the two holder sections 37 and 38 form together a shaping surface 58, which is disposed transversely of axis 15a, and is annular except as interrupted by thread 36, and against which the upper portion 29a of the thread is deformed in backing relation. Surface 58 extends radially from the minor diameter of external thread 19 of the fastener to the major diameter of that thread, and is accurately located to precisely control the formation of axially inner surface 33 of the end turn of the fastener (see FIGS. 5, 5a and 5b).

Ram 46 is driveable axially from the position of FIG. 6 to the position of FIG. 7 by a suitable pressure applying unit or tool 59, which may typically be an electrically actuated trip hammer, an electrically or pneumatically actuated press, or other suitable mechanism having a hammer or drive element 60 which is power actuable downwardly along axis 15a in FIG. 6, relative to the outer body 61 of unit 59, to drive ram 46 from the FIG. 6 position to the FIG. 7 position. The outer body or housing of unit 59 may be mounted stationarily with respect to frame or guide structure 50, as by an appropriate bracket structure represented somewhat diagrammtically at 62.

The force applying unit 59 may be operated automatically in response to advancement of body 18a into holder 35, and to the FIG. 6 position. For this purpose, an electrical control system may be provided, for closing a circuit from a power source 63 through electrically conductive guideway 41 and electrically conductive holder section 37 to electrically conductive metal fastener body 18a, which upon contact with surface 53 of electrically conductive ram 46 closes a circuit through that body 46 and the conductive material of frame structure 50, and lines 64 and 65 to unit 59. When thus electrically energized, unit 59 acts to apply a momentary force downwardly against ram 46, displacing it from the FIG. 6 position to the FIG. 7 position, followed by release of the force to enable upward returning movement of ram 46 until the next successive electrical triggering energization of unit 59. Closure of the described electrical circuit acts to also energize the previously mentioned time delay circuit 45 from power source or battery 63, which circuit causes actuating mechanisms 43 and 44 to open holder sections 37 and 38 after a predetermined timed delay interval sufficient to first allow completion of the thread deforming operation.

To now describe briefly a cycle of operation of the mechanism illustrated in FIG. 6, to the extent that that mechanism has thus far been described, assume first of all that the holder sections 37 and 38 are in their FIG. 6 closed positions, but that the insert body 18a has not as yet been positioned in the holder. An operator then screws body 18a axially into the internal thread 36 of holder 35 (upwardly as seen in FIG. 6), until the axially outer extremity of thread 19 contacts surface 53' of the ram, to close the previously mentioned electrical circuit. This contact causes unit 59 to immediately press downwardly on the ram, and displace the ram from the FIG. 6 position to the FIG. 7 position, in a manner deforming a portion of the upper end turn of thread 19 downwardly, from the broken line positions of FIGS. 5, 5a, 5b, 5c and 5d to the full line positions of those figures. Upon such downward deformation, the underside of the deformed portion of the thread is forced tightly against the backing surface 58 of holder sections 37 and 38, at least through the portion of the thread which commences at line 5—5 of FIG. 4 and extends leftwardly therefrom to location 31, to thereby forge the deformed portion of the thread to the full line condition of FIGS. 5, 5a, 5b, 5c and 5d, and force undersurface 33 to assume a shape corresponding to that of backing surface 58 of the holder. The upper surface of the thread is similarly deformed by surface 53' of the ram to the inclined condition illustrated at 32 in FIGS. 5, 5a, 5b, 5c and 5d, with the deformation preferably (though not necessarily) being halted by ultimate engagement of the ram with surface 57 of the holder. Desirably, the parts are so interrelated that surface 53' does not deform the thread at all at a location radially inwardly beyond the minor diameter of thread 19, to thus leave end surface 21 of the body 18a in its initial transverse condition through the entire radial extent from the diameter of counterbore 22 to the minor diameter of external thread 19.

After a predetermined delay interval has expired just sufficient to allow the discussed deformation of the thread by ram 46, time delay unit 45 actuates mechanism 43 and 44 to separate holder sections 37 and 38 to their broken line positions of FIG. 6, and thus release body 18a to fall downwardly into an appropriate hopper or receptacle, following which mechanism 43 and 44 automatically return sections 37 and 38 radially inwardly to their initial closed positions in preparation for the next cycle of operation.

If desired, the holder 35 and/or pressure applying unit 59 may be actuated manually, rather than by power. Also, it is contemplated that a power unit may if desired be employed for screwing the body 18a into holder 35, as for instance the unit represented diagrammatically at 66 in FIG. 6. This unit may be an automatic feed mechanism taking a series of the threaded bodies 18a sequentially from a supply hopper represented at 67, and holding those within an appropriate chuck structure 68 which acts to screw the bodies 18a threadedly into holder 35, from the broken line position of FIG. 6 to the full line position.

After completion of the deforming operation in the apparatus of FIGS. 6 and 7, the key grooves are formed, and the keys are installed, and the fasteners are then ready for use. When a particular fastener is screwed into a carrier part as shown in FIG. 1, the very precise formation of axially inner surface 33 of the deformed portion of the thread, by the discussed forging operation of ram 46 against backing surface 58, enables the attainment of a very precise positioning of the fastener, with surface 21 in a flush position, or preferably slightly underflush position, with respect to carrier part surface 16. In this position, the leading ends 28 of locking portions 25 of keys 12 are preferably spaced slightly above and out of engagement with countersink surface 17 (see FIG. 4) so that the deformed thread serves as the only shoulder for halting advancement of the insert into the carrier part.

It is contemplated that the backing surface 58 of FIG. 6, and the resultant axially inner surface 33 of the deformed portion of the thread as seen in FIG. 5, of course need not be disposed directly transversely of axis 15 or 15a, though such a transverse position is considered preferable. If desired for some uses, these surfaces 58 and 33, as viewed in axial section, may be disposed at an angle with respect to a true transverse plane, as for instance at the downwardly and outwardly flaring angle illustrated in FIG. 8, where the undersurface 33', corresponding to surface 33 of FIG. 5, flares at such an angle.

I claim:

1. The method of forming a fastener body having an external thread adapted to be screwed into a carrier part, and carrying an additional thread to which a coacting member is connectible, and having a surface at the axially outer ed of said external thread which is to be received in flush or slightly underflush position with respect to the carrier part; said method including initially providing said external thread in undeformed helical condition, positioning a shaping surface of predetermined contour at the axially inner side of an axially outer end turn of said external thread, deforming at least a portion of said end turn of the thread axially inwardly to a condition forming at its axially inner side a stop shoulder surface adapted to engage axially inwardly against said carrier part and positively halt advancement of the fastener body into the carrier part at said flush or slightly underflush position, and engaging said axially inner side of said end turn by said shaping surface during said deformation in a relation resisting said axial deformation of said end turn and giving to said stop shoulder surface an accurately predetermined position and contour corresponding to said shaping surface to precisely control said flush or slightly underflush ultimate position of the fastener body.

2. The method as recited in claim 1, in which said shaping surface is initially spaced axially inwardly from said inner side of said end turn, and said deforming step includes deforming said end turn generally axially inwardly toward and against said shaping surface.

3. The method as recited in claim 1, in which said shaping surface is initially spaced axially inwardly from said inner side of said end turn, and said deforming step includes deforming said end turn generally axially inwardly toward and against said shaping surface, and maintaining said fastener body in fixed position relative to said shaping surface during said deformation.

4. Apparatus for forming a fastener body having an external thread adapted to be screwed into a carrier part, and carrying an additional thread to which a coacting member is connectible, and having a surface at the axially outer end of said external thread which is to be received in flush or slightly underflush position with respect to the carrier part; said apparatus including means for deforming at least a portion of the axially outer end turn of said external thread axially inwardly to a condition forming at its axially inner side a stop shoulder surface adapted to engage axially inwardly against said carrier part and positively halt advancement of the fastener body into the carrier part at said flush or slightly underflush position, said means including a shaping structure positioned and constructed to engage said axially inner side of said end turn during said deformation in a relation resisting said axial deformation of said end turn and giving to said stop shoulder surface an accurately predetermined position and contour corresponding to said shaping structure to precisely control said flush or slightly underflush position of the fastener body.

5. The method of forming a fastener body having an external thread adapted to be screwed into a carrier part, and carrying an additional thread to which a coacting member is connectible, and having a surface at the axially outer end of said external thread which is to be received in flush or slightly underflush position with respect to the carrier part; said method including initially providing said external thread in undeformed condition, advancing said fastener body axially to a predetermined position of engagement of an axially outer end turn of said external thread with a deforming surface, halting said advancement of the fastener body at precisely said predetermined position by said engagement with the deforming surface, and then moving said deforming surface axially inwardly in a relation deforming at least a portion of said end turn axially inwardly to form at its axially inner side a stop shoulder surface for halting advancement of the fastener body into said carrier part at said flush or slightly underflush position, said end turn being deformed axially inwardly against a backing surface shaped to give to said stop shoulder surface a precisely predetermined position and contour.

6. Apparatus as recited in claim 4, in which said means include a second structure located at the axially outer side of said end turn and adapted to move generally axially inwardly relative to said end turn and relative to said first mentioned structure and displace at least a portion of said end turn toward and against said first structure.

7. Apparatus as recited in claim 6, including means for holding said fastener body in predetermined fixed position relative to said shaping structure during said deformation.

8. Apparatus as recited in claim 6, including means for holding said fastener body in predetermined fixed position relative to said shaping structure during said deformation, said holding means having an internal thread into which said fastener body is threadedly connectible.

9. Apparatus as recited in claim 6, including means for holding said fastener body in predetermined fixed position relative to said shaping structure during said deformation, said holding means having an internal thread into which said fastener body is threadedly connectible, and means responsive to relative movement of a fastener body into said internal thread to a predetermined position therein for actuating said deforming means to deform said end turn.

10. Apparatus as recited in claim 6, including means for holding said fastener body in predetermined fixed position relative to said shaping structure during said deformation, said holding means having an internal thread into which said fastener body is threadedly connectible, said holding means including a plurality of sections which are relatively separable to release said fastener body after said deformation.

11. Apparatus as recited in claim 4, including means for holding said fastener body during said deformation, and means responsive to relative movement of a fastener body to a predetermined position relative to said holding means for actuating said deforming means to deform said end turn.

12. Apparatus as recited in claim 4, in which said means include a second structure located at the axially outer side of said end turn and adapted to move generally axially inwardly relative to said end turn and relative to said first mentioned structure and displace at least a portion of said end turn toward and against said first structure, there being means for holding said fastener body and into which said fastener body is advanceable to a position of contact with said second structure, and means responsive to contact of said fastener body with said second structure to actuate the latter relative to said fastener body to deform said end turn.

13. Apparatus as recited in claim 4, in which said means include a second structure located at the axially outer side of said end turn and adapted to move generally axially inwardly relative to said end turn and relative to said first mentioned structure and displace at least a portion of said end turn toward and against said first structure, there being means for holding said fastener body and into which said fastener body is advanceable to a position at which the fastener body contacts said second structure and is halted thereby in a predetermined setting for deformation.

14. Apparatus for forming a fastener body having an external thread adapted to be screwed into a carrier part, and carrying an additional thread to which a coacting member is connectible, and having a surface at the axially outer end of said external thread which is to be received in flush or slightly underflush position with respect to the carrier part; said apparatus including a holder containing an internal thread into which said external thread of the fastener body is threadedly advanceable, a deforming structure axially opposite said holder and positioned to engage an axially outer end of the fastener body and halt advancement of the fastener body into the holder at a predetermined deformation position, means for actuating said deforming structure axially inwardly against said end of the fastener body, said structure having a deforming surface adapted to engage an axially outer end turn of said external thread and deform it generally axially inwardly upon said axially inward movement of the structure, and means forming a backing surface essentially fixed relative to said holder and located at the axially inner side of said end turn and against which said end turn is deformed axially inwardly by said deforming structure to form a precisely located stop surface on the axially inner side of said end turn adapted to engage a carrier part and halt advancement of the fastener body at said predetermined flush or slightly underflush position of said first mentioned surface.

15. Apparatus as recited in claim 14, in which said backing surface is formed on said holder.

16. Apparatus as recited in claim 14, in which said holder includes a plurality of partial threaded sections which are relatively separable to release the fastener body and which have said backing surface formed thereon.

17. Apparatus as recited in claim 14, in which said holder includes a plurality of partial threaded sections which are relatively separable to release the fastener body and which have said backing surface formed thereon essentially transversely of the axis of their threads, said deforming surface flaring essentially conically about said axis to deform the axially outer side of said end turn to a correspondingly flaring condition.

18. Apparatus as recited in claim 14, in which said holder includes a plurality of partial threaded sections which are relatively separable to release the fastener body and which have said backing surface formed thereon essentially transversely of the axis of their threads, said deforming surface flaring essentially conically about said axis to deform the axially outer side of said end turn to a correspondingly flaring condition, there being electrical control means automatically responsive to advancement of said fastener body into contact with said deforming structure to cause said axially inward movement of the deforming structure.

References Cited
UNITED STATES PATENTS

| | | | |
|---|---|---|---|
| 1,963,845 | 6/1934 | Hosking | 10—86 |
| 1,967,276 | 7/1934 | Wilson | 10—86 |
| 2,330,511 | 9/1943 | Money | 10—86 |
| 2,855,609 | 10/1958 | Moore | 10—86 |
| 2,408,457 | 10/1946 | Tripp | 10—86 |
| 2,791,787 | 5/1957 | Neuschotz | 10—86 |
| 3,280,872 | 10/1966 | Neuschotz | 151—41.72 |
| 3,280,874 | 10/1966 | Rosan | 151—41.72 |
| 3,356,121 | 12/1967 | Tabor | 10—86 |
| 3,497,890 | 3/1970 | Coyle | 10—86 |
| 3,084,359 | 4/1963 | Abbott | 10—72 |

FOREIGN PATENTS

| | | | |
|---|---|---|---|
| 593,955 | 2/1925 | France | 10—72 |

CHARLES W. LANHAM, Primary Examiner

E. M. COMBS, Assistant Examiner

U.S. Cl. X.R.

10—10, 86